US010747236B2

United States Patent
Peasgood (10) Patent No.: US 10,747,236 B2
(45) Date of Patent: Aug. 18, 2020

(54) SYSTEMS AND PROCESSES FOR CALIBRATING UNMANNED AERIAL VEHICLES

(71) Applicant: FLIR UNMANNED AERIAL SYSTEMS ULC, Vancouver (CA)

(72) Inventor: Michael Peasgood, Waterloo (CA)

(73) Assignee: FLIR UNMANNED AERIAL SYSTEMS ULC, Vancouver (CA)

(*) Notice: Subject to any disclaimer, the term of this patent is extended or adjusted under 35 U.S.C. 154(b) by 54 days.

(21) Appl. No.: 15/550,275

(22) PCT Filed: Feb. 19, 2016

(86) PCT No.: PCT/CA2016/000045
§ 371 (c)(1),
(2) Date: Aug. 10, 2017

(87) PCT Pub. No.: WO2016/131127
PCT Pub. Date: Aug. 25, 2016

(65) Prior Publication Data
US 2018/0024571 A1   Jan. 25, 2018

Related U.S. Application Data

(60) Provisional application No. 62/118,276, filed on Feb. 19, 2015.

(51) Int. Cl.
*G05D 1/10* (2006.01)
*G01C 25/00* (2006.01)
(Continued)

(52) U.S. Cl.
CPC ............ *G05D 1/102* (2013.01); *B64C 19/00* (2013.01); *B64C 29/0033* (2013.01);
(Continued)

(58) Field of Classification Search
CPC .... G05D 1/101; G05D 1/0088; G05D 1/0011; G05D 1/0297; G05D 1/102; G05D 1/12;
(Continued)

(56) References Cited

U.S. PATENT DOCUMENTS 9,352,834 B2 * 5/2016 Davies ................ G05D 1/102
9,753,355 B2 * 9/2017 Waibel ................ H04N 5/2252
(Continued)

FOREIGN PATENT DOCUMENTS

WO    2014186636 A1   11/2014

OTHER PUBLICATIONS

WIPO, International Search Report and Written Report for PCT Application No. PCT/CA2016/000045 dated May 10, 2016.

*Primary Examiner* — Hunter B Lonsberry
*Assistant Examiner* — Luis A Martinez Borrero
(74) *Attorney, Agent, or Firm* — Haynes and Boone, LLP (57) ABSTRACT

An unmanned aerial vehicle and process for automatically calibrating the unmanned aerial vehicle having at least one magnetic sensor is described. The calibration process involves receiving an internal or external control command to initiate a take-off process by the unmanned aerial vehicle. A hover mode maintains the unmanned aerial vehicle at hover position, and a calibration rotation sequence rotates the unmanned aerial vehicle. The calibration process further involves receiving measurement data from sensors of the unmanned aerial vehicle during the calibration rotation sequence and calculating calibration parameters using the measurement data. The calibration process may implement corrections using the calibration parameters.

25 Claims, 7 Drawing Sheets

(51) Int. Cl.
  *B64C 39/02* (2006.01)
  *B64C 19/00* (2006.01)
  *B64C 29/00* (2006.01)
(52) U.S. Cl.
  CPC ............ *B64C 39/02* (2013.01); *B64C 39/024* (2013.01); *G01C 25/00* (2013.01); *G01C 25/005* (2013.01); *B64C 2201/027* (2013.01); *B64C 2201/141* (2013.01)
(58) Field of Classification Search
  CPC .......... G05D 1/00; B64C 19/00; G01C 25/00; G01C 25/005; G01C 1/0088; G01C 1/0212; G01C 1/0027; G01C 1/0011
  See application file for complete search history.

(56) References Cited

U.S. PATENT DOCUMENTS

| | | | | |
|---|---|---|---|---|
| 9,783,294 | B2* | 10/2017 | Johannesson | B64C 27/08 |
| 10,168,601 | B2* | 1/2019 | Waibel | G05D 1/005 |
| 10,565,732 | B2* | 2/2020 | Zhao | B64C 39/024 |
| 10,571,779 | B2* | 2/2020 | Waibel | G05D 1/0011 |
| 2008/0201096 | A1* | 8/2008 | Wright | G01C 17/38 |
| | | | | 702/92 |
| 2010/0121599 | A1* | 5/2010 | Boeve | G01C 17/38 |
| | | | | 702/93 |
| 2012/0245875 | A1* | 9/2012 | del Castillo | G01C 17/38 |
| | | | | 702/92 |
| 2015/0142211 | A1* | 5/2015 | Shehata | H04N 7/181 |
| | | | | 701/2 |
| 2015/0160658 | A1* | 6/2015 | Reedman | G05D 1/102 |
| | | | | 701/3 |
| 2015/0212391 | A1* | 7/2015 | Waibel | H04N 5/2251 |
| | | | | 701/2 |
| 2015/0259066 | A1* | 9/2015 | Johannesson | B64C 27/08 |
| | | | | 244/17.27 |
| 2015/0314870 | A1* | 11/2015 | Davies | G05D 1/102 |
| | | | | 701/3 |
| 2016/0069681 | A1* | 3/2016 | Johnson | G01C 17/38 |
| | | | | 33/303 |
| 2016/0179096 | A1* | 6/2016 | Bradlow | B64C 19/00 |
| | | | | 701/8 |
| 2016/0247115 | A1* | 8/2016 | Pons | G06Q 10/087 |
| 2016/0259032 | A1* | 9/2016 | Hehn | G01S 5/0289 |
| 2017/0167871 | A1* | 6/2017 | Johnson | G01C 17/38 |
| 2017/0184629 | A1* | 6/2017 | Pan | G01C 25/005 |
| 2017/0301111 | A1* | 10/2017 | Zhao | H04N 17/002 |
| 2018/0065759 | A1* | 3/2018 | Michalski | G08G 5/0069 |
| 2018/0094998 | A1* | 4/2018 | Youssef | G01L 13/06 |
| 2018/0149948 | A1* | 5/2018 | Waibel | G03B 15/006 |
| 2018/0279105 | A1* | 9/2018 | Huber | H04W 4/90 |
| 2019/0088098 | A1* | 3/2019 | Gangumalla | G01L 19/02 |
| 2019/0243212 | A1* | 8/2019 | Waibel | H04N 5/2253 |
| 2019/0385339 | A1* | 12/2019 | Zhao | B64C 39/024 |

* cited by examiner

SYSTEMS AND PROCESSES FOR CALIBRATING UNMANNED AERIAL VEHICLES

FIELD

The improvements generally relate to the field of unmanned aviation, and in particular to calibrating unmanned aerial vehicles.

INTRODUCTION

An unmanned aerial vehicle ("UAV") does not have a human operator located at the UAV. A UAV may include various components such as sensors and measurement and navigation instruments. It is desirable to calibrate the components of the UAV to improve accuracy. Existing systems for calibrating UAVs involve a manual calibration process with human intervention. For example, known calibration processes may require a user to rotate the UAV manually to get a set of measurements using the sensors, navigation, and measurement instruments of the UAV. This manual calibration process requires the user and the UAV to be co-located. This may make the user susceptible to any dangers (e.g. hazardous materials, military threats) to which the UAV is exposed or may draw attention to the UAV (which may be small relative to the user). It may also be difficult to get the user to and from the site of the UAV. Further, if user intervention is required for calibration then the take-off process of a UAV cannot be entirely automatic. In addition, if long-term monitoring is required then a subsequent UAV may switch with an initial UAV to provide continuous long-term monitoring. If manual intervention is required for calibration then automatically switching UAVs for continuous long-term monitoring may not be possible. In addition, a manual calibration process may be susceptible to human error. For example, a user may not complete a full rotation, especially if the user is rushed due to a stressful environment. Finally, manual calibration may increase time to deployment for a UAV as there may be a time lag created due to the manual step.

Accordingly, there exists a need for an improved calibration process for UAVs, or at least an alternative.

SUMMARY

In accordance with one aspect, there is provided an unmanned aerial vehicle having a frame, an operations control to control operation of the unmanned aerial vehicle, a calibration control to initiate automatic calibration of the unmanned aerial vehicle by a hover mode for maintaining the unmanned aerial vehicle at hover position, and a calibration rotation sequence for rotating the unmanned aerial vehicle around at least one axis of the frame. The unmanned aerial vehicle has flight control and navigation control for controlling motion of the unmanned aerial vehicle to implement the hover mode and the calibration rotation sequence. The unmanned aerial vehicle has sensors to obtain measurement data during the calibration rotation sequence, wherein the sensors include at least one magnetic sensor for calibration. The unmanned aerial vehicle has a calibration calculator to calculate calibration parameters using the measurement data obtained during the calibration rotation sequence.

In accordance with some embodiments, the calibration control updates or corrects measurement or compensation values of the magnetic sensor or other instrument using the calibration parameters.

In accordance with some embodiments, the calibration parameters comprise a bias factor and a scale factor.

In accordance with some embodiments, the unmanned aerial vehicle has a communication device to transmit the measurement data obtained during the calibration rotation sequence or calibration parameters or other calibration data to a control station or a ground station.

In accordance with some embodiments, the communication device receives a verification notification indicating a successful calibration from an internal component or from the control station or the ground station.

In accordance with some embodiments, the communication device receives a calibration error notification indicating an unsuccessful calibration from an internal component or the control station or the ground station.

In accordance with some embodiments, the unmanned aerial vehicle has a data store device to store the measurement data obtained during the calibration rotation sequence, the calibration parameters, and other calibration data.

In accordance with some embodiments, the unmanned aerial vehicle has a communication device to transmit location data, the location data identifying the location of the unmanned aerial vehicle during the calibration rotation sequence to a control station or a ground station.

In accordance with some embodiments, the unmanned aerial vehicle has a communication device to transmit a calibration error notification computed by a processor using the measurement data obtained during the calibration rotation sequence, the bias factor, and the scale factor.

In accordance with another aspect, there is provided a process for calibrating an unmanned aerial vehicle having at least one magnetic instrument. The process involves receiving an internal or external control command to calibrate the at least one magnetic sensor of the unmanned aerial vehicle, receiving an internal or external control command to initiate a take-off process by the unmanned aerial vehicle to move the unmanned vehicle from a ground position to an in-air position, initiating a hover mode for maintaining the unmanned aerial vehicle at hover position (the hover position being an in-air position), initiating a calibration rotation sequence to rotate the unmanned aerial vehicle, receiving measurement data from one or more sensors of the unmanned aerial vehicle during the calibration rotation sequence, calculating calibration parameters using the measurement data obtained during the calibration rotation sequence, and updating measurement or compensation values obtained from the at least one magnetic sensor using the calibration parameters.

Many further features and combinations thereof concerning embodiments described herein will appear to those skilled in the art following a reading of the instant disclosure.

DESCRIPTION OF THE FIGURES

In the figures.

DETAILED DESCRIPTION

Figure 1:
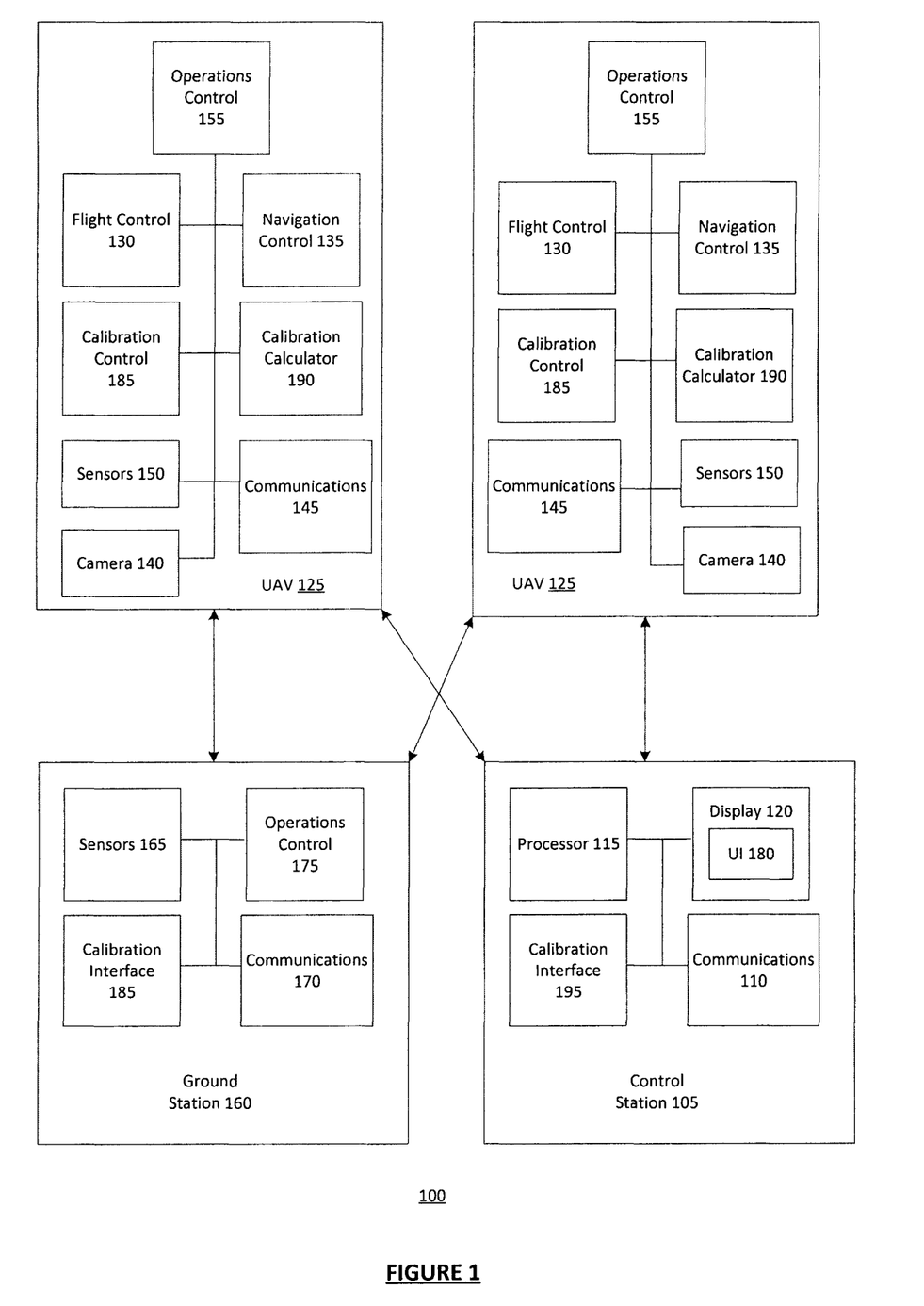
FIG. 1 is a schematic view of an example system for UAVs according to some embodiments.

FIG. 1 shows an example system 100 comprising a vehicle 125, implemented as a UAV. As will be described herein, vehicle 125 is configured for automatic calibration of one or more components. The system 100 optionally connects vehicle 125 to a control station 105 which may be implemented as a computing device. The system 100 optionally includes one or more ground stations 160 in communication with the control station 105. The system 100, and in particular, the control station 105 may serve to control operation of one or more vehicles 125 remotely. In some embodiments, vehicle 125 is configured for autonomous control and calibration without use of control station 105. Vehicle 125 is configured to generate vehicle status data from sensor subsystem 150, and to transmit the vehicle status data to the control station 105 or ground station 160. The vehicle status data may be transmitted to the control station 105 or ground station 160 in real-time, or near real-time. The vehicle status data may include vehicle location data from sensors 150, images and video from camera 140, and so on. The vehicle status data may include navigation and other measurement data from navigation control 135, as well as operating parameters from operations control 155 and flight control data from flight control 130. The vehicle status data may include communication status data from communication devices 145.

The control station 105 is configured to display at least a subset of the received vehicle status data for each vehicle 125 in an interface (such as User Interface (UI) 180, for example). The display may provide a graphical representation of the respective vehicle location data of each of the vehicles 125. Through the interface, the control station 105 may receive control command input. The control command input is associated with one of the vehicles 125 having its vehicle status data displayed in the interface. The control station 105 may then transmit the received control command, or a command derived therefrom, to the respective vehicle 125. The interface may enable a user to view status and control operation of each of the vehicles 125 such that the location of each vehicle is shown in the interface, and each vehicle 125 may be independently controlled through the interface by selecting a particular one of the vehicles 125 to control. In this way, multiple vehicles 125 may be monitored and controlled through an interface at the control station 105.

The control station 105 may comprise a communications subsystem 110, a processor or central computer system 115 and a display 120. The communications subsystem 110 allows for wireless communications between the control station 105 and each vehicle 125, and between the control station 105 and each ground station 160, when ground stations 160 are used. The UI 180 is generated by processor 115 for display on the display 120 of a control station 105, which remotely controls the vehicles 125, or as part of a control system for one or more vehicles. Display 120 may be a touch-screen display, but a non-touch display may be used. In some embodiments, control station 105 may be on a single-unit computer (i.e. one with a built-in display), but a multi-unit computer (i.e. with a separate display) may be used instead.

Control station 105 provides multi-vehicle control with synchronization, across multiple interface panels. The interface provides an indication of which vehicle 125 is being controlled. Each panel shows a different perspective on what is happening, but the states of the panels may be synchronized, such that changing the currently selected vehicle 125 in one panel changes the currently selected vehicle 125 in the other panels, and each panel clearly indicates the currently selected vehicle 125. Further detail on the controlling vehicle 125 using interface 180 is provided in PCT Application No. PCT/CA2013/000442 entitled "System and Method for Controlling Unmanned Aerial Vehicles", the entire contents of which is hereby incorporated by reference. Control station 105 may control interface panels to display a location of the vehicle 125 and a visual representation of received calibration parameters. For example, the interface may display notification of a successful calibration or an error message. Control station 105 may generate interface panels with trigger indicia such as a graphical button to trigger the automatic calibration process.

Each ground station 160 comprises a sensor subsystem 165 (which may include a global positioning system (GPS) subsystem), a wireless communications subsystem 145 and an operations controller 175 or central computer. The sensor subsystem 165 may be used to acquire environmental data if the ground station 160 is proximate or near the vehicle 125, where the environmental data may be used for the calibration process, such as location data, weather data, and so on.

Figure 2:
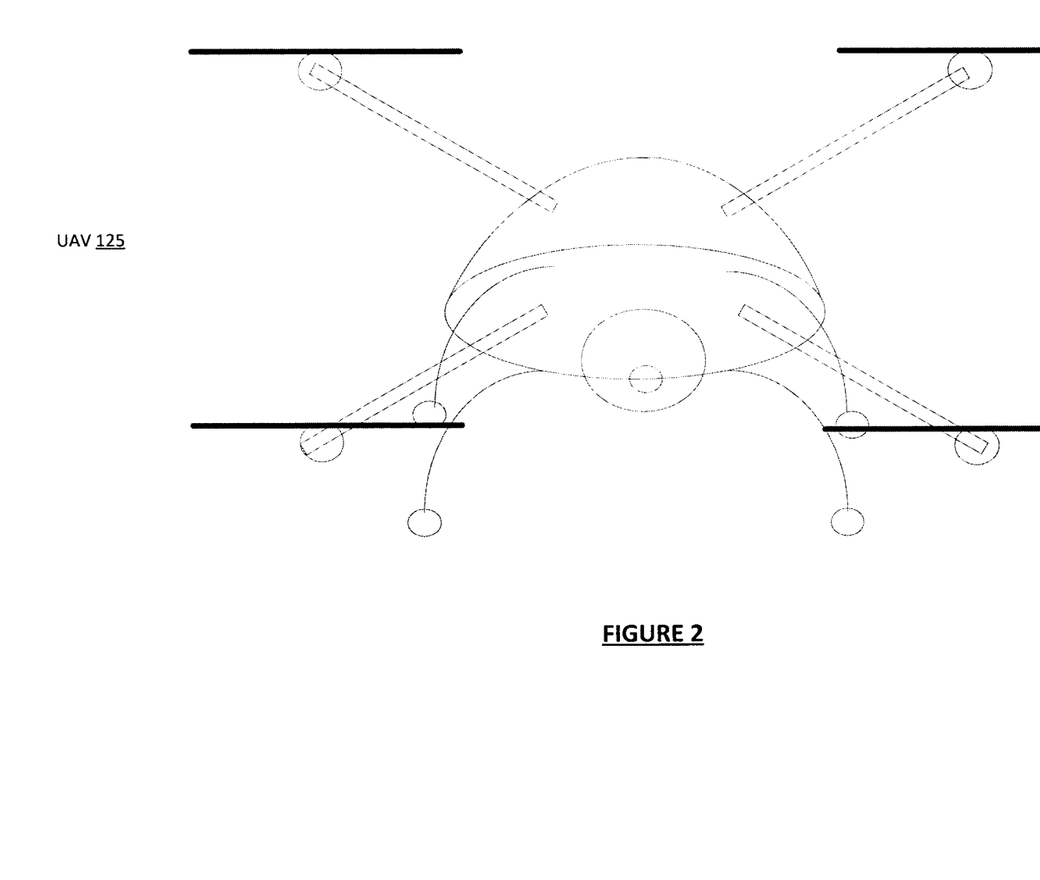
FIGS. 2 and 3 are schematic views of an example UAV according to some embodiments.

FIG. 2 illustrates a schematic view of vehicle 125 (FIG. 1) with a frame that connects external hardware (e.g. navigation instruments, flight instruments, sensor subsystem 150 and camera 140) and encloses internal hardware (flight control subsystem 130, a navigation control subsystem 135, a communications subsystem 145, an operations controller or central computer or processor 155, a calibration control subsystem 185, a calibration calculator 190). Although shown separately, calibration control subsystem 185 may form part of operations control 155.

Referring back to FIG. 1, operations controller 155 transmits control commands to other components to control operation of the vehicle 125. Calibration control subsystem 185 provides control commands to the operations controller 155 to trigger calibration of at least one magnetic sensor 150, such as a magnetometer by actuating various hardware components to implement a hover mode and calibration rotation sequence automatically. The calibration may be in response to a detected event. An internal or external event may trigger the calibration processes, such as a control signal from remote station or detection of out of date or incorrect onboard calibration data, for example. The magnetometer is a magnetic sensor and may not necessarily be magnetized itself. For example, calibration control subsystem 185 initiates a hover mode and a calibration rotation sequence.

Calibration calculator 190 is configured to compute different calibration parameters from sensor 150 data. For example, calibration calculator 190 may compute offset values, including bias, scale, hard-iron, soft-iron, rotation of field offset value, and so on. Calibration calculator 190 may also compute heading, elevation and bank angle from readings from a dual-axis magnetometer and triaxial accelerometer sensors. As will be described herein, vehicle 125 may implement a compass system that compensates for environmental factors (e.g. wind) or physical tilt of vehicle 125 which may impact heading, elevation and bank angle calculations. Vehicle 125 uses calibration control subsystem 185 to calibrate out hard-iron and soft-iron effects on heading calculations to counter their impact when using magnetometer data. The process described herein may correct calibration in two dimensions or three dimensions. Although shown separately, calibration calculator 190 may form part of calibration control subsystem 185 or operations controller 155. The vehicle 125 may detect an environmental factor and then dynamically update the sequence (e.g. tilt) to address the environmental factor (e.g. wind). This adds an extra frame of reference to the calculation. Flight control subsystem 130 controls flight instruments in response to control commands from the operations controller 155. The flight instruments are controlled by flight control subsystem 130 to control motion of the vehicle 125. For example, vehicle 125 implements a hover mode for maintaining the unmanned aerial vehicle 125 at a hover position in the air. The flight instruments are also configured to control motion of the vehicle 125 to implement the calibration rotation sequence for rotating the unmanned aerial vehicle around different axes of its frame. Navigation control subsystem 135 controls navigation instruments in response to control commands from the operations controller 155. Navigation control subsystem 135 interacts with the flight control subsystem 130 so that navigation and flight instruments work together to implement the hover mode and the calibration rotation sequence. Sensors 150 obtain measurement data during the calibration rotation sequence. The sensors 150 include at least one magnetic sensor for calibration, such as, for example, a magnetometer. As described in further detail herein, calibration calculator 190 calculates calibration parameters (e.g. bias factor and a scale factor) using the measurement data obtained during the calibration rotation sequence for calibration correction.

Sensors 150 may include different types of sensors, and may provide navigational instruments and flight instruments. As noted, an example sensor 150 is a magnetic sensor or magnetic field sensor, such as a magnetometer, which is used to measure the magnetization of a magnetic material, magnetic field strength, changes to the magnetic field strength, and the direction of the magnetic field at the current location of vehicle 125. A measurement unit may include an accelerometer and magnetometer to compute heading, elevation or bank angle of the UAV 125. Other example sensors 150 include navigation instruments such as a gyroscope (e.g. device for measuring and maintaining orientation, measuring rotational velocity, and so on) and a magnetic compass. Sensors 150 may also include position instruments such as an accelerometer (e.g. device that measures proper acceleration or linear acceleration or g-force) and a GPS. The position instruments may be used to stabilize position of the vehicle 125 and may include instruments for angle, displacement, distance, speed, and acceleration. Sensors 150 may also include acoustic, sound and vibration instruments, transportation instruments (e.g. speedometer), chemical instruments, electrical instruments, magnetic instruments, and radio instruments, environmental, weather or moisture instruments, fluid flow instruments, radiation instruments, optical or light sensors, pressure instruments, force or density instruments, thermal instruments (e.g. thermocouple, thermometer), proximity instruments, and so on. Sonar range finders, laser range finders, and cameras are other example sensors 150. Communication subsystem 145 transmits vehicle status data and measurement data obtained during the calibration rotation sequence, along with other data including calibration parameters, such as a bias factor and a scale factor, to the control station 105 or the ground station 160. Measurement data or calibration parameters may also include rotational velocity, linear acceleration, magnetic field strength, and other data obtained or calculated from sensor subsystem 150. The vehicle status data and measurement data obtained during the calibration rotation sequence may be displayed on an interface at a remote station, along with other data about the vehicle 125, such as location data.

Vehicle 125 may be associated with a vehicle data set (e.g. data collected or computed for a specific vehicle 125) that may be updated in real-time or near-real-time. The data set for each vehicle 125 may be stored and updated at a remote data storage device of control station 105 or ground station 160, or a subset thereof may be stored and maintained at a local data storage device of operations controller 155.

For example, vehicle 125 may have an associated "ground level" measurement which indicates the altitude of the ground at the vehicle 125 take-off location. Vehicle 125 may have an associated "ground height" which is defined as the distance of the vehicle 125 above ground level or from ground station 160. Vehicle may have an associated "hover position" or height which is defined as the distance of the vehicle 125 above ground or from ground station 160 to be maintained such that the vehicle hovers at the hover position while implementing a hover mode during the calibration process. Hover height may be high enough from the ground to clear any obstacles, to avoid hitting ground crew or personnel, and to move away from any magnetic anomalies in the area. For example, in a meadow clearing free of ground obstacles, the hover height may be much lower than in an industrial area with transformers, large motors and other electrical equipment in the vicinity. The hover height may be statically assigned at design time, or could be dynamically adjusted using control signals or programmatically based on environmental or other factors.

Vehicle 125 may have associated relative height measurements, such as a height relative to other vehicles 125, the control station 105 or ground station 160. The relative heights may be used to prevent collision and to maintain a specific minimum altitude (e.g. hover mode). Ground height may not be considered a similar dimension to X and Y dimensions; it is measured differently, with different error ranges and error conditions, and is generally considered an adjunct to two-dimensional flight navigation. An immediate at-a-glance view of the heights (via a graphical representation on UI 180, for example) allows the user to understand the altitude situation of vehicles 125. In many situations, the user seldom needs specific details about absolute height during normal flight apart from maintaining a minimum safe altitude, but often needs a general idea of relative heights, and a general idea of vertical velocity (i.e. rising vs. falling).

The vehicle data set may be gathered by the vehicle 125 sensor subsystem 150 and transmitted to the control station 105 by the vehicle's 125 communications subsystem 145.

Vehicle 125 may implement different flying modes and flight plans (including calibration modes), including manual flying mode and waypoint flying mode. A flight plan may be relative to other objects, such as another vehicle 125 or ground station 160, or may be absolute defined by navigational data. A waypoint is a user-specified position, represented by coordinates on a map to provide a waypoint indication. It is a navigable marker, meaning that a vehicle 125 may be directed to go to that position. There may be attributes associated with the waypoint, such as specific actions that a vehicle 125 must take upon reaching the waypoint (e.g. take photos, send back photos, deliver a payload, aim a payload, trigger a payload to sample, land, move to a specific height, pause before continuing on the waypoint route, raise an alert at the control station 105, or some other set of actions), a minimum or maximum altitude which the vehicle 125 must not exceed while within a specified proximity to the waypoint, a maximum velocity which the vehicle 125 must not exceed when within a specified proximity to the waypoint, or some other attribute.

A flight plan may consist of multiple waypoint routes, with each waypoint route associated with one or more vehicles 125. A flight plan may consider different special areas, including a no-fly zone, points of interest, targets, perimeters, and so on.

A waypoint route is a series of connected, directed vectors representing the desired path of travel for the vehicle 125 from a start point to an end point, and optionally moving through any number of intermediate navigable markers (waypoints or points of interest). There may be attributes associated with each vector in the waypoint route, such as a maximum, minimum, desired or default velocity (which may be specific to the vector or may be shared across the entire waypoint route); a maximum, minimum, desired or default UAV height (which may be specific to the vector or may be shared across the entire waypoint route); or a specific action for the vehicle 125 to take while travelling along the vector (e.g. take photos, send back photos, aim a payload, deliver a payload, trigger a payload to sample, raise an alert at the control station 105, or some other set of actions).

A no-fly zone is conceptually a boundary though which a vehicle 125 may not pass, such that a vehicle 125 may not be located within the no-fly zone. A no-fly zone may be a closed boundary, ordered series of points, and the lines connecting these points, a regular shape, such as a circle or oval, with specified defining characteristics (e.g., for a circle, center point and radius).

A point of interest ("Pal") is a navigable marker (that is, a marker to which the vehicle may be navigated), unless it is located within a no-fly zone. A POI may also be used as a target for camera viewing, sensor readings, or as an objective point for another on-vehicle payload.

A target is a non-navigable marker (that is, a marker to which a vehicle may not be navigated). A target is often used to indicate an objective point for camera viewing, sensor readings, or some other on-vehicle payload. A target may be contained within a no-fly zone.

A perimeter is conceptually a shape through whose boundary a vehicle may not pass, such that a vehicle must be located within the perimeter. A perimeter may be a closed shape, ordered series of points, and the lines connecting these points, or a regular shape, such as a circle or oval, with specified defining characteristics (e.g., for a circle, center point and radius).

In order for the vehicle 125 to implement different flying modes and flight plans accurately, sensors 150 (e.g. magnetic sensors) and other navigation instruments and flight instruments with magnetized or magnetic components should be properly calibrated to ensure proper operation of the vehicle 125. As an example, accuracy of position control, measured as the error between the desired and actual position of the vehicle over time, may depend on the accuracy of the calibration of the various sensors 150.

As noted, previous approaches to calibration of vehicle 125 components require manual calibration by a user. According to embodiments described herein, there is provided an improved vehicle 125 that implements an automatic calibration process through a specific set of movements or motions (e.g. calibration rotation sequence) to ensure proper calibration of the vehicle 125. The improved vehicle 125 is operable to stabilize itself at a hover position and implement a calibration rotation sequence. For example, calibration rotation sequence may involve rotation of roll or pitch or yaw orientation for three different axes of the frame of the vehicle 125.

Figure 5:
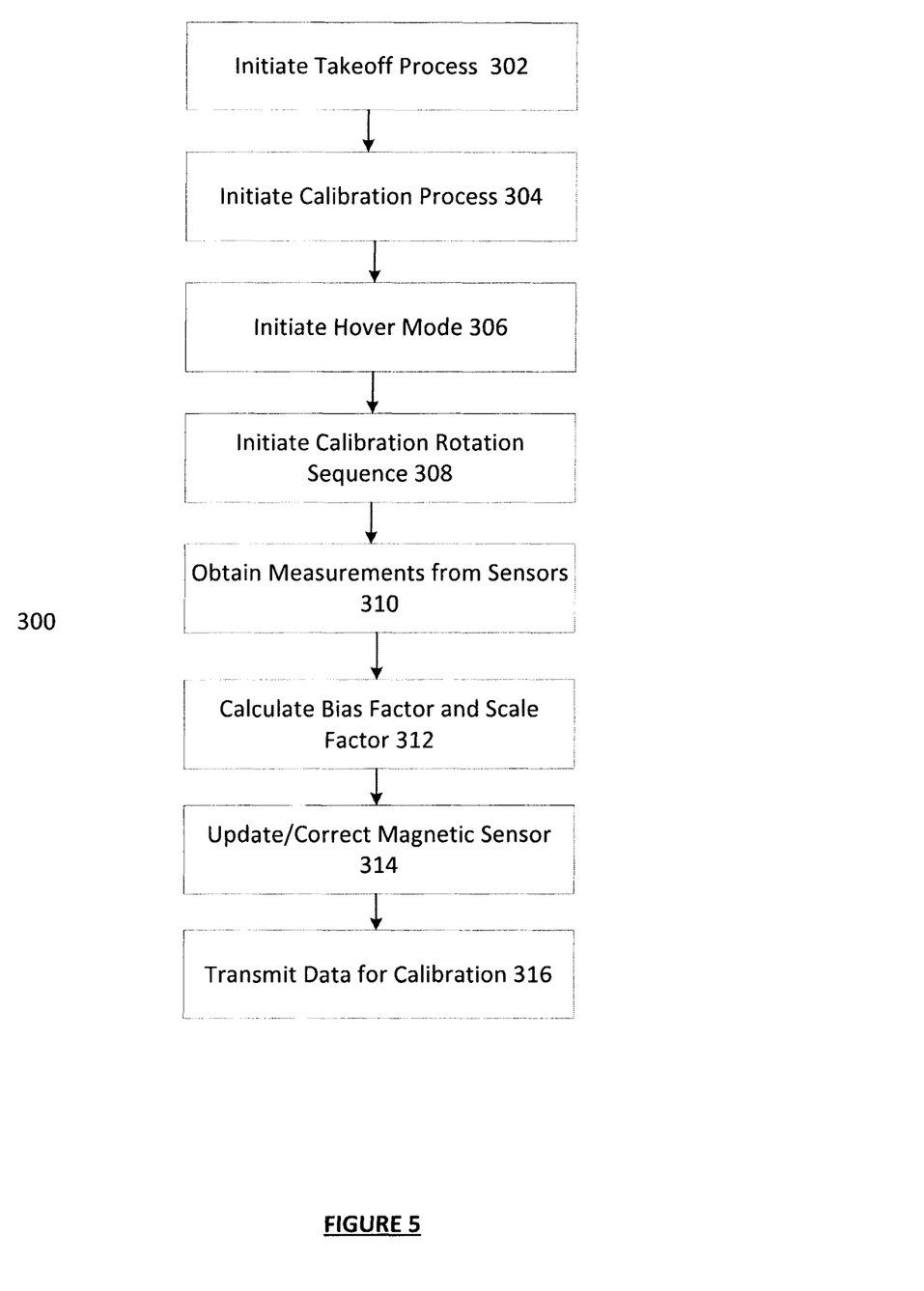
FIGS. 5 and 6 are flowchart diagrams of processes for calibrating a UAV according to some embodiments.

FIG. 5 illustrates a flow chart diagram of a process 300 for automatically calibrating vehicle 125 according to some embodiments. The calibration process is implemented by vehicle 125 in order to calibrate one or more sensors 150, such as magnetic sensors, including for example a magnetometer or 3D digital compass of the vehicle. The process 300 can be applied to magnetic sensors of any number of axes. Any single axis magnetic field sensor can be calibrated using the process described. In typical applications, either a 2-axis sensor measuring in the Xu-Yu plane of the vehicle 125, or a 3-axis sensor measuring along each of the Xu-Yu-Zu axes may be used for process 300.

In accordance with some embodiments, the components used to implement the process 300 for calibration may be contained within the vehicle 125 itself. For example, control station 105 or ground station 160 may not be required for calibration process 300. A fully autonomous vehicle 125 could be preprogrammed (via operations controller 155) to fly between two GPS co-ordinates while relaying data via communications 145 (e.g. WiFi) and automatically implement the calibration rotation sequence on start-up. In other example embodiments, control station 105 or ground station 160 may be used to implement different aspects of the calibration process 300.

When calibrating the vehicle 125 at a specific location the calibration may be difficult because the earth's magnetic field at the specific location may be unknown. The meaning of measurement values of the magnetometer may be unknown at the specific location due to magnetism on vehicle 125 and so on. Problems may arise from magnetism of the vehicle (e.g. due to exposure to external magnetic fields), or objects attached to the vehicle frame (e.g. such as payloads), or changes in the characteristics of the magnetic sensor (which may be caused by, for example, changes in temperature or exposure to strong magnetic fields). The process 300 may accommodate for the need to calibrate automatically at different locations by using a model of the field strength around the surface of the earth as a reference for the measured sensor output. An example implementation is provided by the National Oceanic and Atmospheric Administration (NOAA) Technical Report for the World Magnetic Model or WMM.

At 302, the vehicle 125 receives a control command to initiate a take-off process. As noted, the vehicle 125 may be fully autonomous and the control command may be generated by the vehicle 125 automatically as part of start-up to trigger take-off. In other examples, the control command may be received from or triggered by control station 105 or ground station 160. For take-off, the vehicle 125 moves from a ground position to an in-air position. The take-off process may be part of an automatic start-up sequence for the vehicle 125. A user may power on the vehicle 125 and the vehicle 125 may automatically initiate calibration mode to trigger the calibration process.

At 304, the vehicle 125 receives a control command to calibrate at least one magnetic sensor. In example embodiments, the control command may be received from the control station 105 to trigger calibration. Alternatively, the control command for calibration may be issued by vehicle 125 itself automatically at start-up. In such example embodiments, the vehicle 125 may automatically calibrate at take-off without receiving a control command to calibrate from the control station 105. That is, calibration may be part of the take-off process. The operations controller 155 may receive a control command to calibrate the magnetic sensors from the calibration control subsystem 185 to initiate the calibration process. Alternatively, the calibration control subsystem 185 may be integrated as part of the operations controller 155. The take-off and calibration process may be a modified start-up sequence for the vehicle 125. The calibration process may involve a hover mode and a calibration rotation sequence, as described herein.

At 306, the vehicle 125 initiates a hover mode for maintaining itself at a fixed hover position, the hover position being an in-air position. The hover position may include a ground height position relative to the ground station 160, for example. The hover position may be defined as a 3D position. The hover position may be remotely defined by the control station 105, for example, and may be updated. The hover position may be configurable as a parameter of the vehicle 125. As an illustrative example, the hover position may be 1 meter, 1.5 meters, 2 meters and so on off the ground.

At 308, the vehicle 125 initiates a calibration rotation sequence to rotate itself around different axes. The operations controller 155 may actuate navigation control 135 and flight control 130 instruments to control movement of the vehicle 125, and generate forces in various directions to generate the rotational movement of vehicle 125.

Figure 3:
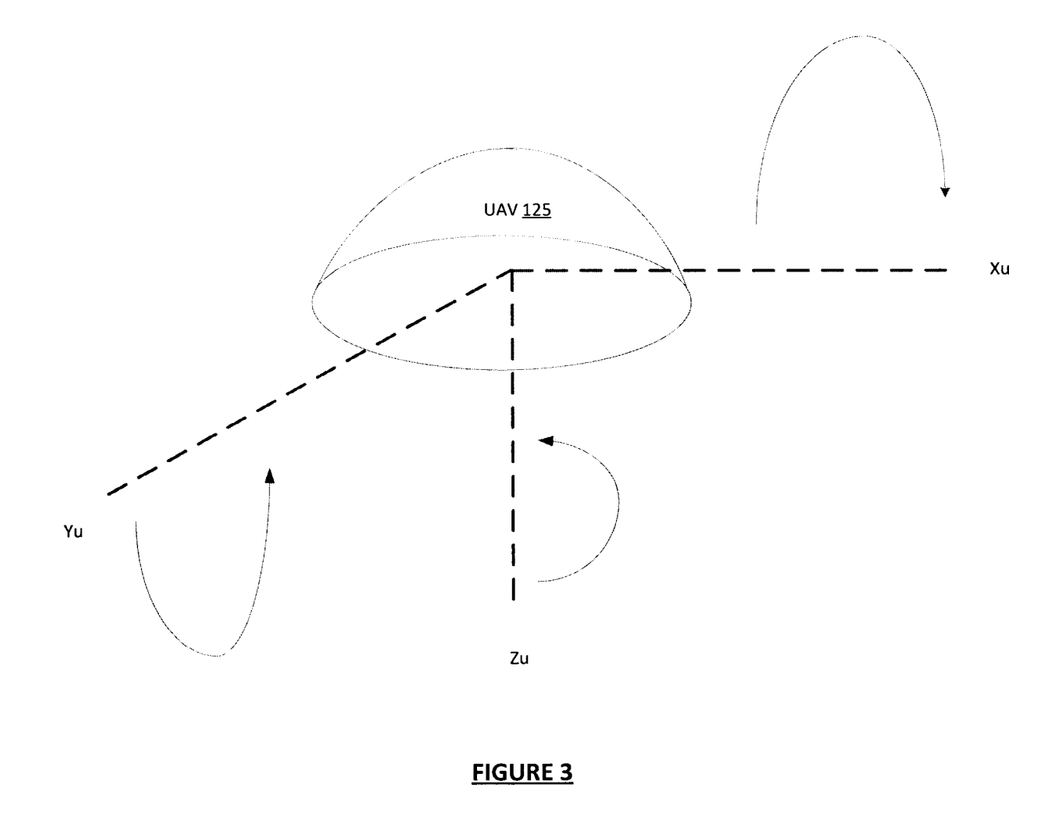

FIG. 3 illustrates three example axes of the frame of the vehicle 125, referred to as Xu, Yu, and Zu. The example illustration shows a coordinate system or frame reference using the Right-Hand Rule. The three axes (X axis, Y axis, and Z axis) may provide a three dimensional (3D) representation of the vehicle. The calibration rotation sequence may rotate the vehicle 125 in different planes (e.g. X and Y plane) or around different axes (X axis, Y axis, and Z axis) of its frame automatically just after take-off.

The purpose of the rotation process is to gather the sensor measurements required to complete a calibration correction. Distortions of the earth's magnetic field are a result of external magnetic influences generally classified as either a hard-iron or soft-iron effect. The calibration correction may be a "hard-iron" or "soft-iron" correction, for example.

The UAV 125 provides an automation of hard-iron calibration in some examples. The soft-iron calibration process (e.g. modeling the ellipsoidal distortion of the field) is also possible using the data gathered in the rotation process. They may not be as significant compared to the hard-iron corrections for this application but the automated rotation and data collection may support it. Hard-iron may be a permanent magnet, like in a speaker, which may be difficult to magnetize, and difficult to demagnetize. Soft-iron may generally be incidental, such as magnetized metal (e.g. a steel casing).

The calibration rotation sequence may rotate the vehicle about the Z axis of the vehicle by 360 degrees or more. In the course of this rotation, the magnetic sensor in the vehicle frame measures the earth's magnetic field in a number of different orientations, corresponding to the heading of the vehicle at the time when measurements are made. This set of measurements can be then be used to estimate the calibration parameters (e.g. hard-iron, soft-iron) of the magnetometer. In this example, hard-iron calibration parameters may be the bias values for each of the three axes (Xu, Yu, Zu) in the vehicle frame. The scale factors for the sensors in the Xu and Yu axes can also be estimated from this process.

The bias value (also called a null offset value) is the output of the sensor when measuring a zero world-frame magnetic field strength. The bias value calculated by the calibration process compensates for offsets in the sensor output when exposed to a zero strength field, as well as for the local magnetic field components of the vehicle itself. Such local fields may be created by magnetized ferrous materials in the frame of the vehicle, or electrical currents running through the vehicle, as part of the propulsion system for example. This is referred to as a "hard-iron" calibration. A "soft-iron" calibration is another example.

An additional advantage over manual calibration is that the propulsion system is fully operational during the calibration routine. As a result, the calibration routine automatically compensates for offsets due to electrical currents that may not be present during manual pre-flight calibration.

The scale value (also called the full-scale output) defines the output of the sensor when exposed to a specified, non-zero field. For example, a sensor may give an output of 300 mV above its bias value when exposed to a magnetic field of 1 Gauss. The scaling factor would then be 300 mV/Gauss.

To compute the bias values for the X and Y axes, the calibration process computes the mean value of the maximum and minimum sensor measurements gathered during the rotation.

An example process may calculate heading by applying a rotation that removes bank angle followed by a second rotation that removes elevation (or the reverse sequence). The sequence of rotations realigns the local x-y plane with the reference X-Y plane and then corrections to the magnetometer data may be made, along with compensating for hard-iron and soft-iron effects. Other processes may be used, such as taking the average of a set or subset of measurements taken at equally-spaced times or headings during the rotation process. Vehicle 125 is configured to implement tilt correction in real-time during the calibration process using sensor values from non-calibrated sensors.

The computed bias value may be the estimated error in the sensor output when in a zero magnetic field. This computed bias value is then stored and subtracted from the future sensor output measurements to generate calibration-corrected magnetic field measurements.

The scale factor for the X and Y sensors can be estimated using a model of the earth's magnetic field at the position on the earth where the calibration is taking place. The scale factor is estimated by dividing the difference between the maximum and minimum sensor outputs (the range of measurements) by twice the predicted horizontal field strength (the range of magnetic field intensity). The bias may be the y-intercept and the scale factor may be the slope, for example.

If the vehicle is capable of automatically rotating fully about all three axes, or internally rotating its magnetometer such that the Z axis is aligned with the horizontal plane, it may be possible to use the same process to compute the Z axis bias and scale factors as used for the X and Y sensor axes. However, this may not typically be the case for a UAV 125. During the rotation process, the Z axis magnetic sensor measures an approximately constant external field as it rotates about the global frame vertical axis. Because there is no range of output, the scale factor for the Z axis may not be estimated. Instead, a nominal value for the sensor may be used. For practical purposes this is acceptable, since the Z axis sensor contributes to the heading estimate only as sin(pitch angle), which is typically small for a hovering UAV 125. To compute the Z axis bias, the calibration process may use a model of the earth's magnetic field. The model predicts the vertical field strength at the position on the earth where the calibration is taking place. We compute the Z axis bias value by subtracting the measured sensor output from the model predicted value. The difference is the field strength error. This computed bias value is then stored and subtracted from the future sensor output measurements to generate calibration-corrected magnetic field measurements of the Z axis sensor.

Figure 7:
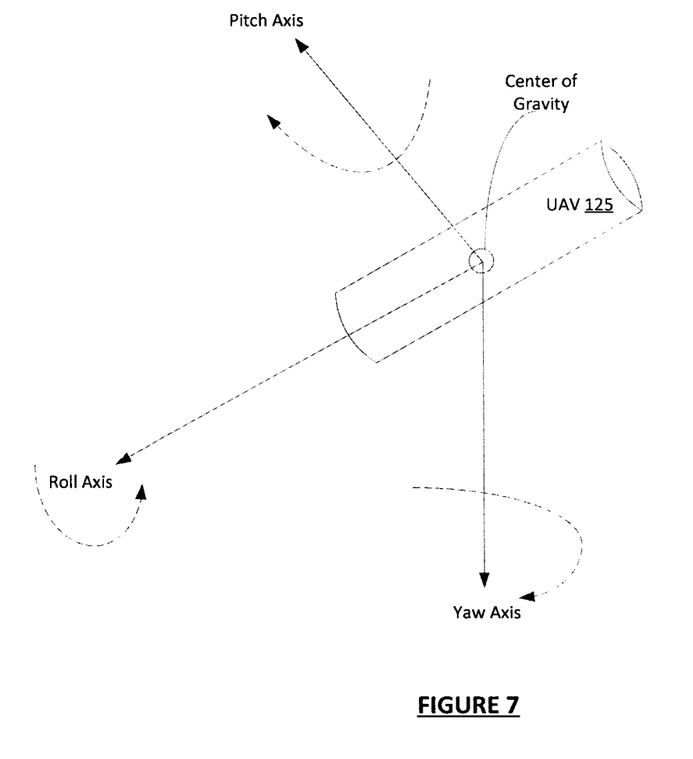
FIG. 7 is a schematic view of an example UAV according to some embodiments.

FIG. 7 illustrates another example schematic of vehicle 125 with three axes, referred to as a pitch axis, a roll axis, and a yaw axis. Vehicle 125 may rotate in three dimensions (pitch, roll, yaw) about its centre of mass or gravity. As an illustrative example, the calibration rotation sequence may rotate the heading or yaw of the vehicle 125 for 360 degrees with an end pointing the heading back in the same direction as it started.

At 310, the vehicle 125 obtains measurement data from sensors 150 during the calibration rotation sequence. For example, vehicle 125 may sample measurements using sensors 150, such as the magnetometer to measure the maximum and minimum measurement in each orientation during the rotation sequence.

The calibration rotation sequence controls rotation of the vehicle. If the magnetometer is the instrument being calibrated then the measurement values obtained by the magnetometer generally are not used for calculating the calibration parameters. In some example embodiments, the vehicle 125 ignores measurement values obtained from the magnetometer and instead only relies on measurement values obtained from other sensors 150 such as a gyroscope rotation rate to get relative reading to know that the UAV 125 has rotated a full 360 degrees.

The heading of the vehicle 125 may be tracked during rotation using sensors 150 including the magnetometer. In windy conditions a process may involve aligning the vehicle in a known position and integrating a gyroscope to maintain position.

At 312, calibration calculator 190 calculates calibration parameters for the vehicle using the measurement data obtained during the calibration rotation sequence as described herein. Example calibration parameters include relative offset values, such as bias factors and scale factors described herein (e.g. hard-iron, soft-iron, rotation of field offset). The calibration calculator 190 may be located in the vehicle 125. In other example embodiments, the calibration interface 195 of control station 105 or calibration interface 185 of ground station 160 may include a calibration calculator for calculating calibration parameters. In such example embodiments, the vehicle 125 transmits the measurement data to the control station 105 or ground station 160 which in turn performs the calculations for the bias factor and a scale factor.

Calibration calculator 190 determines what the magnetometer measurements mean in view of earth's magnetic field based on the relative offsets, namely, what is a zero magnetometer field reading. The scale factor may be a relative offset compared to the magnetic field (e.g. 10 units relative to magnetic field strength). Bias is created by instruments that are magnetized or magnetic and other sensors 150 do not need calibration generally. Bias depends on other magnetic fields created by vehicle 125 itself. For example the vehicle may have a magnetic battery that creates its own magnetic field that contributes to the bias factor of the vehicle. As described herein, bias may be created by hard-iron and soft-iron distortions. Calibration calculator 190 may calculate the calibration parameters using various techniques described herein.

For example, calibration calculator 190 may compare values for the earth's magnetic field to measurement values obtained during X and Y axis rotations (as Z axis may not change) to determine a scale factor. Based on this comparison, calibration calculator 190 may determine what the earth's magnetic field should be (using the scale factor) to determine the bias factor. For example, data storage device (local to vehicle 125, or remote at control station 105) may include a lookup table linking bias factor to earth's magnetic field adjusted by the scale factor.

As an example, the calibration calculator 190 may use measurements from magnetometer during rotation sequence and obtain maximum and minimum sensor readings for two axis rotations (e.g. X axis and Y axis). The operations controller 155 takes average of maximum and minimum to find bias offset. The operations controller 155 calculates the bias offset by looking for a zero reading.

At 314, the vehicle 125 implements calibration correction by updating or correcting the measurement or compensation values of the magnetic device(s) and other sensors 150 based the calculated calibration parameters to ensure proper calibration. That is, the vehicle 125 automatically corrects calibration of the magnetic sensors using the calculated calibration parameters, including offset values for the bias factor and the scale factor.

At 316, the vehicle 125 transmits data relating to the calibration. For example, the data may indicate whether the calibration was successful or not, along with a location of the vehicle 125 during the calibration process. This may be useful to identify successful calibration locations, or locations that usually result in calibration errors, and so on.

The data relating to the calibration provided to the control station 105 may include a feedback notification that the calibration process is complete. The feedback notification may indicate whether the calibration was successful and the location of the vehicle 125 during calibration. The actual measurement values and the calculated calibration parameters may be transmitted.

For example, if a vehicle attempts take off and calibration unsuccessfully in an environment with weird or anomalous magnetic fields (e.g. earth-based anomalies), then a calibration error feedback notification may be sent to the control station 105, or may be recorded in a local log of vehicle 125. The control station 105 may issue control commands to change the physical location of the vehicle and re-attempt calibration. For example, the control station 105 may issue control commands to increase or decrease the altitude of the hover position and try to recalibrate, move the vehicle 125 to another location to try to recalibrate, and so on.

Figure 6:
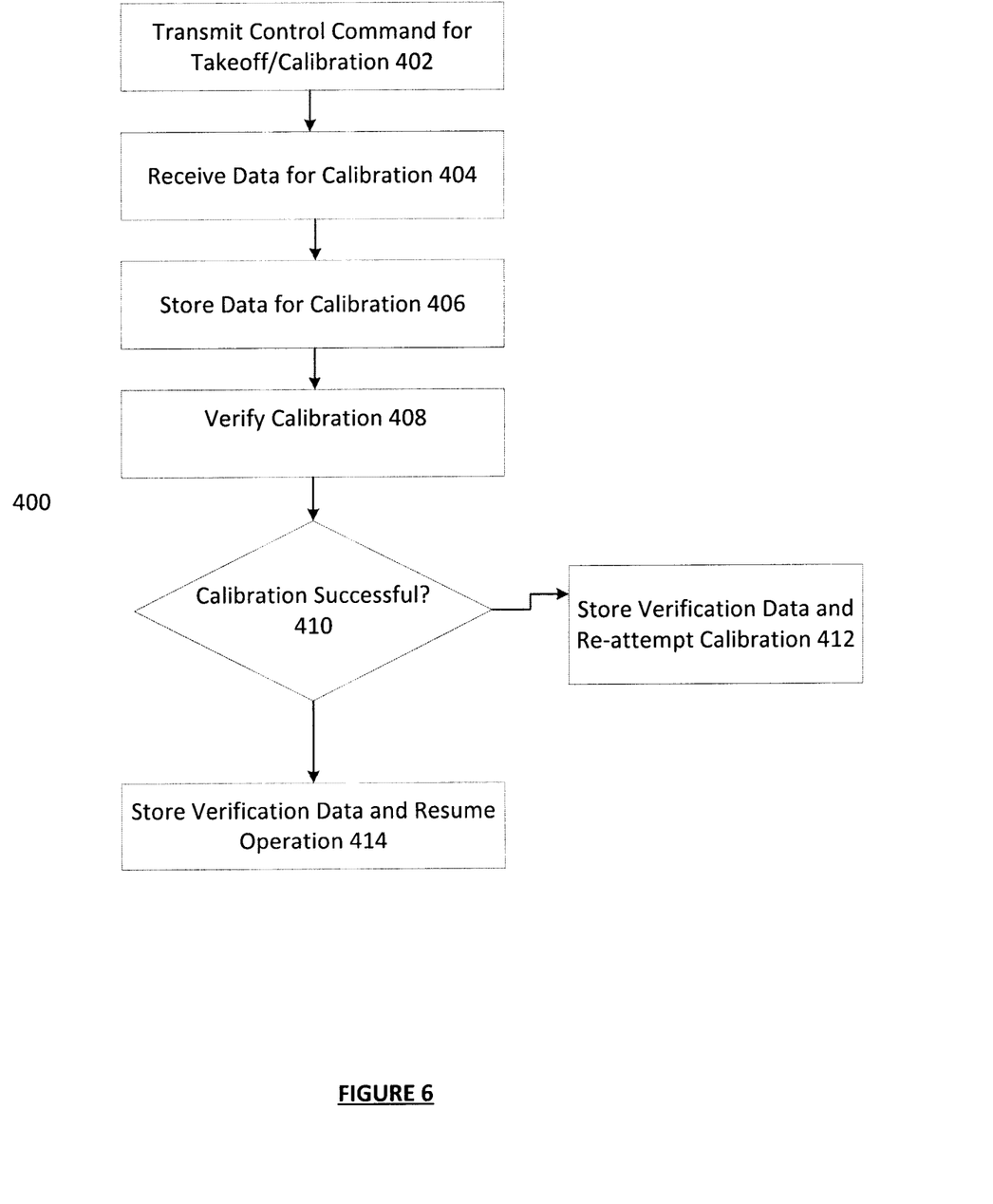

FIG. 6 illustrates another process 400 for calibrating the vehicle 125. The process 400 is described in relation to the control station 105 as an example, but one or more steps may be implemented at the vehicle 125 or ground station 160, or a combination thereof.

At 402, the control station 105 transmits a control command to initiate take-off and calibration of the vehicle 125, as described herein. As noted, alternatively, vehicle 125 may automatically initiate calibration at start-up.

At 404, the control station 105 receives data for the calibration process from the vehicle 125, including the measurement values obtained during the calibration rotation sequence and calculated calibration parameters.

At 406, the control station 105 stores the data for the calibration process at a data storage device. The data may be stored as part of a repair log or flight log (local or remote) for the vehicle 125. The control station 105 may store calibration locations in association with a notification indicating whether or not the calibration was successful. The stored data may be used for subsequent calibrations to identify known good or bad locations for calibrations, for example.

At 408, the control station 105 verifies some or all of the data for the calibration process, including the calculated calibration parameters. The control station 105 or vehicle 125 (at operations controller 155) may implement the verification step for the measurements to ensure they are reasonable by comparing the measurements to threshold values, or stored calibration data for previous calibrations by the vehicle 125. The verification may be performed at the vehicle 125 in some example embodiments.

At 410, the control station 105 (or vehicle 125) determines whether the calibration was successful. This may be based on the threshold check, or a feedback notification indicating whether the calibration was successful. The data may also include the location of the vehicle 125 during calibration.

If the calibration was not successful, at 412, control station 105 (or vehicle 125) may store the verification data indicating that the calibration was not successful (along with an associated location of the vehicle 125 during calibration) and re-attempt calibration at the same location or a different location. Control station 105 may transmit control commands to vehicle 125 to trigger the calibration process and to adjust other parameters, such as the location of the vehicle 125.

If the calibration was successful, at 414, control station 105 may store the verification data indicating that the calibration was successful (along with an associated location of the vehicle 125 during calibration). Vehicle 125 may also store this data locally.

Environmental factors may make it difficult for the vehicle 125 to hover in a stationary position during the calibration process.

For example, wind may make it difficult for the vehicle 125 to hover in a stationary position during the calibration process. The vehicle 125 may drift due to wind, such as, e.g., a sixty km per hour cross wind. In order for the vehicle 125 to stay in a stationary position during hover, the vehicle 125 is operable (via operations control 155) to tilt on one of its axes so that the propellers or other flight instruments are pushing the vehicle 125 against the wind. The vehicle 125 tilts during the calibration rotation sequence. For example, the vehicle 125 may tilt along one axis at forty five degrees and perform the calibration rotation sequence around its own titled axis.

To hold position in a strong wind, a reasonable estimate of the vehicle's heading may be required. The magnetometer may typically be used as a primary sensor 150 in estimating the vehicle's heading, but before and during the calibration process, the values from the magnetometer may not be accurate, leading to poor position control during the calibration process. To address this problem, an alternative process of estimating heading for the limited duration of the calibration process can be used. For example, the user can place the vehicle on the ground with a known heading (such as pointing due north) before takeoff. The heading can then be estimated based on the initial heading and the integration over time of rotational rates measured by gyroscopes until the completion of the calibration process.

The tilt angle adds an additional frame of reference for calculating the offset values. That is, for the calibration rotation sequence with tilt there are two frames of reference: (1) the frame of reference for the vehicle 125 with the body or frame of the vehicle on two horizontal axes and one vertical axis; and (2) the "real world" frame of reference. In still air (with no wind) the two frames of reference align. However, with cross wind the tilt in the vehicle 125 displaces the frame of reference for the vehicle 125 from the "real world" frame of reference. The tilt angle is the angle at which the UAV 125 is tilted in order to remain stationary (or near stationary) in wind. It may be dependent on wind direction and speed, propeller speed, propeller shape and pitch, the aerodynamic properties of the rest of the UAV 125, and other factors.

Figure 4:
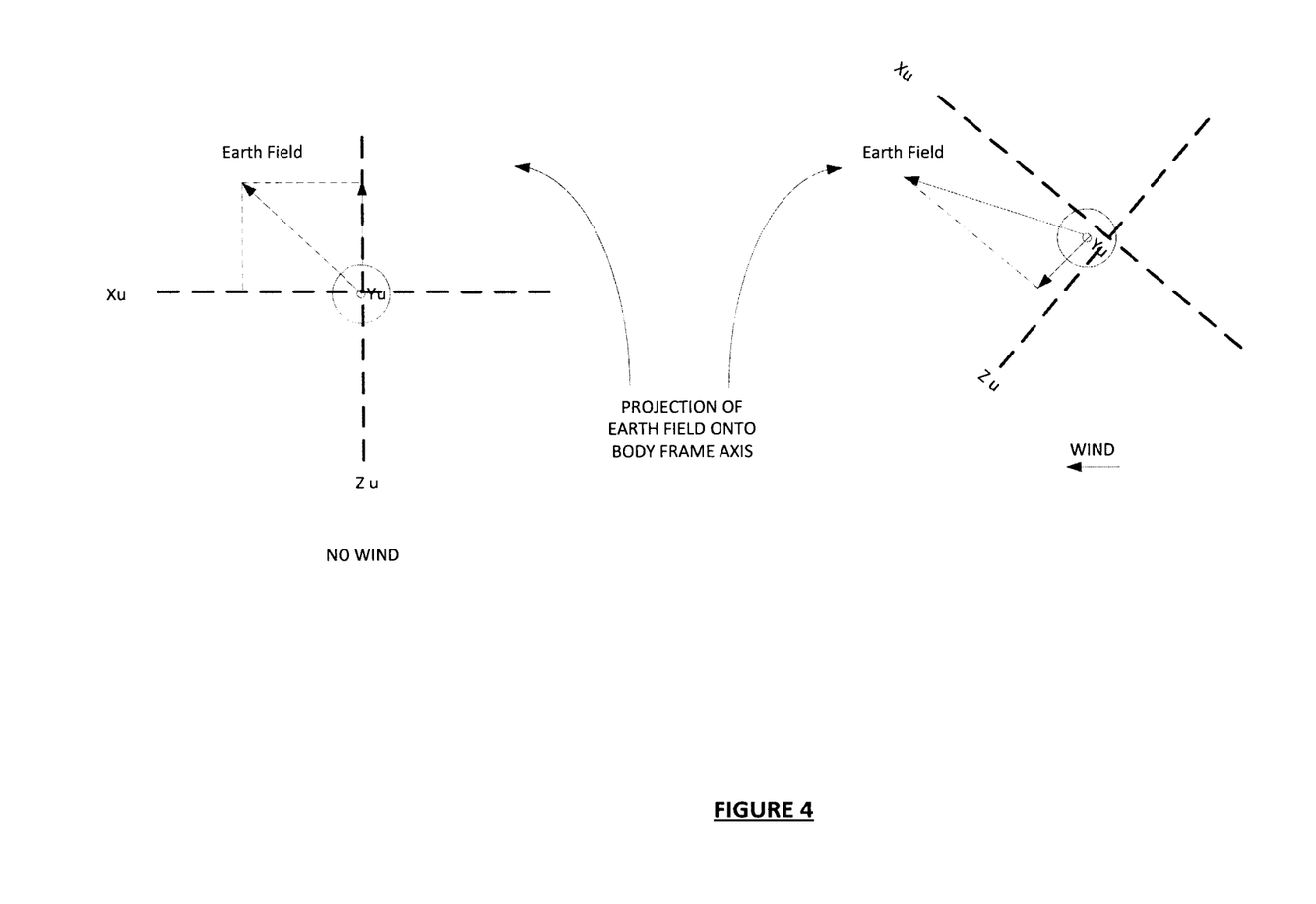
FIG. 4 is an example illustration of a projection of the earth field onto the body frame axis of a UAV.

FIG. 4 illustrates a projection of the earth field (or "real world" frame of reference) to the vehicle 125 frame of reference. The vehicle 125 (at operations controller 155) or control station 105 is operable to map measurement values obtained from the vehicle 125 frame of reference (referenced as Xu Yu Zu, for example) through a 3D vector projection to a "real world" frame of reference. That is, vehicle 125 (at operations controller 155) or control station 105 is operable to use the real world frame of reference as absolute values for the measurements.

That is, vehicle 125 (at operations controller 155) or control station 105 is operable to project measurements obtained from an axis of the vehicle 125, which axis may not be vertical if tilted, to get the expected z-axis of the vehicle 125 that is vertical to align with real world frame of reference. A manual calibration process may not consider wind or other environmental factors when considering measurements. For example, embodiments described herein consider the horizontal part of earth's magnetic field as part of a 3D measurement value obtained during calibration. For manual calibration one generally does not consider the 3D measurement values so one does not need to partition out the horizontal part.

For a manual calibration, the vehicle 125 can be rotated in arbitrary orientations, exposing all 3 axes of the magnetometer to the full range of the earth's magnetic field. This allows a calculation of calibration values by fitting the sensor measurements to a 3-dimensional sphere. In this process, it is assumed that the vehicle may only be able to rotate about the vertical axis, exposing the sensors on the X and Y axes to the full range of earth field's field in the plane of rotation, but the Z axis to only a relatively constant component of the field.

The vehicle 125 may calibrate automatically without requiring manual contact with the vehicle itself. For example, there may be an actuating button or trigger on the ground station 160. On power on or on receipt of take-off command, the vehicle may calibrate automatically. The vehicle 125 may also have a calibrate button to trigger the automatic calibration. The vehicle 125 autonomously hovers and implements rotation sequence to spin around. The calibration parameters are based on requirements of the magnetic sensor to tailor calculation to a specific vehicle 125 as needed. The calibration involves a hover and sequence specific to current, real-time environmental factors, such as wind, for example. An internal event, such as detection of outdated or incorrect calibration data currently onboard vehicle 125 may trigger an automatic calibration. An external event, such as a control command from remote station 105 may also trigger an automatic calibration.

The embodiments of the devices, systems and processes described herein may be implemented in a combination of both hardware and software. For example, code instructions may be used to actuate components of the UAV 125 for the calibration rotation sequence. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding control and computing devices. It should be appreciated that the use of such terms may represent one or more computing devices having at least one processor configured to execute software instructions stored on a computer readable tangible, non-transitory medium. For example, a control station 105 may have a server that includes one or more computers coupled to a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product instructing physical operations, such as controlling movement of the UAV 125, for example. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the processes provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and processes implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The operations controller 155, ground station 160, or control station 105 may be implemented as a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, microelectromechanical Systems (MEMS) or micro-size mechanical devices, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the processes described herein.

A processor may be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

Data storage device may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device may include an I/O interface to enable computing device to interconnect with one or more input devices, such as a keyboard, mouse, camera, touch screen and a microphone, or with one or more output devices such as a display screen and a speaker.

Communication hardware (e.g. communications 145, 110, 170) may include a network interface to enable computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device is operable to register and authenticate users (using a login, unique identifier, and password for example) prior to providing access to applications, a local network, network resources, other networks and network security devices. Computing devices may serve one user or multiple users.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only. The scope is indicated by the appended claims.

What is claimed is:

1. An unmanned aerial vehicle comprising:
   a frame;
   an operations control to control operation of the unmanned aerial vehicle;
   a calibration control to initiate automatic calibration of the unmanned aerial vehicle by a hover mode for maintaining the unmanned aerial vehicle at hover position, and a calibration rotation sequence for rotating the unmanned aerial vehicle around an axis of the frame, wherein the calibration control adjusts the calibration rotation sequence dynamically with a tilt movement for calculation of the calibration measurements in response to an environmental factor that causes a position disturbance;
   flight control and navigation control for controlling motion of the unmanned aerial vehicle to implement the hover mode and the calibration rotation sequence;
   sensors to obtain measurement data during the calibration rotation sequence, wherein the sensors include at least one magnetic sensor for calibration; and
   a calibration calculator to calculate calibration parameters using the measurement data obtained during the calibration rotation sequence.

2. The unmanned aerial vehicle of claim 1 wherein the calibration control updates or corrects measurement or compensation values of the magnetic sensor or other instrument using the calibration parameters.

3. The unmanned aerial vehicle of claim 2 wherein the communication device receives a verification notification indicating a successful calibration from an internal component or from the control station or the ground station.

4. The unmanned aerial vehicle of claim 2 wherein the communication device receives a calibration error notification indicating an unsuccessful calibration from an internal component or the control station or the ground station.

5. The unmanned aerial vehicle of claim 1 wherein the calibration parameters comprise a bias factor and a scale factor.

6. The unmanned aerial vehicle of claim 1 further comprising a communication device to transmit the measurement data obtained during the calibration rotation sequence or calibration parameters or other calibration data to a control station or a ground station.

7. The unmanned aerial vehicle of claim 1 further comprising a data store device to store the measurement data obtained during the calibration rotation sequence, the calibration parameters, and other calibration data.

8. The unmanned aerial vehicle of claim 1 further comprising a communication device to transmit location data, the location data identifying the location of the unmanned aerial vehicle during the calibration rotation sequence to a control station or a ground station.

9. The unmanned aerial vehicle of claim 1 further comprising a communication device to transmit a calibration error notification computed by a processor using the measurement data obtained during the calibration rotation sequence, the bias factor, and the scale factor.

10. The unmanned aerial vehicle of claim 1 further comprising a transceiver to receive calibration trigger signals to trigger the calibration control to initiate the automatic calibration.

11. The unmanned aerial vehicle of claim 1 wherein the calibration control initiates the automatic calibration without human intervention.

12. The unmanned aerial vehicle of claim 1 wherein the calibration control automatically checks stored calibration data for expiry or errors to trigger initiation of the automatic calibration.

13. The unmanned aerial vehicle of claim 1 wherein the environmental factor comprises wind turbulence, and wherein the calibration control detects wind turbulence to adjust the calibration rotation sequence dynamically with a tilt movement for calculation of the calibration measurements to address the wind turbulence.

14. The unmanned aerial vehicle of claim 1 wherein the calibration parameters are based on requirements of the at least one magnetic sensor.

15. The unmanned aerial vehicle of claim 1 wherein the unmanned aerial vehicle detects the environmental factor that causes the position disturbance.

16. A process for calibrating an unmanned aerial vehicle having at least one magnetic instrument, the process comprising:
   receiving an internal or external control command or detecting a calibration event to calibrate the at least one magnetic sensor of the unmanned aerial vehicle automatically;
   automatically initiating a hover mode for maintaining the unmanned aerial vehicle at hover position, the hover position being an in-air position;
   automatically initiating a calibration rotation sequence to rotate the unmanned aerial vehicle around an axis of its frame;
   adjusting the calibration rotation sequence dynamically with a tilt movement for calculation of the calibration measurements in response to an environmental factor that causes a position disturbance;
   receiving measurement data from one or more sensors of the unmanned aerial vehicle during the calibration rotation sequence;
   calculating calibration parameters using the measurement data obtained during the calibration rotation sequence; and
   updating measurement or compensation values obtained from the at least one magnetic sensor using the calibration parameters.

17. The process of claim 16 further comprising receiving an internal or external control command to initiate a take-off process by the unmanned aerial vehicle to move the unmanned vehicle from a ground position to an in-air position.

18. The process of claim 16 further comprising receiving an internal or external control command or detecting a calibration event without human intervention.

19. The process of claim 16 further comprising automatically checking stored calibration data for expiry or errors to trigger initiation of the automatic calibration.

20. The process of claim 16 wherein the environmental factor comprises wind turbulence, and the process comprising automatically detecting the wind turbulence to adjust the calibration rotation sequence dynamically with a tilt movement for calculation of the calibration measurements to address the wind turbulence.

21. The process of claim 16 further comprising automatically calculating the calibration rotation sequence using onboard measurement data.

22. The process of claim 16 further comprising detecting the environmental factor that causes the position disturbance.

23. A system for calibrating an unmanned aerial vehicle comprising:
   an unmanned aerial vehicle having:
      a frame;
      an operations control to control operation of the unmanned aerial vehicle;
      a calibration control to initiate automatic calibration of the unmanned aerial vehicle by a hover mode for maintaining the unmanned aerial vehicle at hover position, and a calibration rotation sequence for rotating the unmanned aerial vehicle around an axis of the frame, wherein the calibration control adjusts the calibration rotation sequence dynamically with a tilt movement for calculation of the calibration measurements in response to an environmental factor that causes a position disturbance;
      flight control and navigation control for controlling motion of the unmanned aerial vehicle to implement the hover mode and the calibration rotation sequence;
      sensors to obtain measurement data during the calibration rotation sequence, wherein the sensors include at least one magnetic sensor for calibration; and
      a calibration calculator to calculate calibration parameters using the measurement data obtained during the calibration rotation sequence;
   a remote control station to send control commands to trigger the automatic calibration and receive the calibration parameters and location data for the vehicle; and
   an interface for displaying the location data for the vehicle and a visual representation of the calibration parameters.

24. The system of claim 23 wherein the environmental factor comprises wind turbulence and the calibration control detects the wind turbulence to adjust the calibration rotation sequence dynamically with a tilt movement for calculation of the calibration measurements to address the wind turbulence.

25. The system of claim 23 wherein the unmanned aerial vehicle detects the environmental factor that causes the position disturbance.

* * * * *